Inventor
Albert H. Emery
By Knight Bro.
Attorneys

A. H. EMERY.
SCALE PLATFORM CHECK AND SUPPORT.
APPLICATION FILED JAN. 21, 1916.

1,222,272.

Patented Apr. 10, 1917.
4 SHEETS—SHEET 3.

Inventor
Albert H Emery,
By Knight Bros
Attorneys

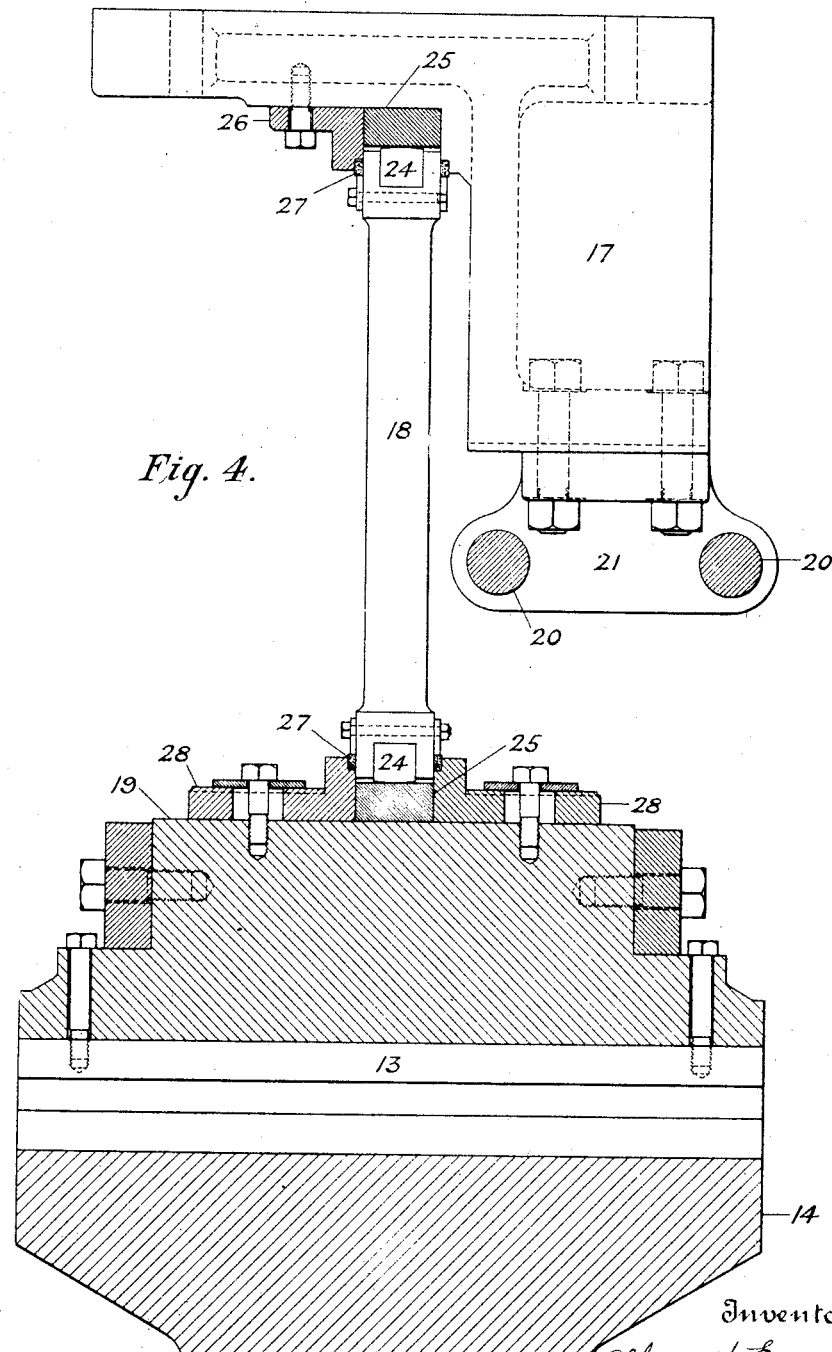

UNITED STATES PATENT OFFICE.

ALBERT HAMILTON EMERY, OF STAMFORD, CONNECTICUT.

SCALE-PLATFORM CHECK AND SUPPORT.

1,222,272.

Specification of Letters Patent.

Patented Apr. 10, 1917.

Application filed January 21, 1916. Serial No. 73,378.

*To all whom it may concern:*

Be it known that I, ALBERT HAMILTON EMERY, a citizen of the United States, residing at Stamford, in the county of Fairfield and State of Connecticut, have invented certain new and useful Improvements in Scale-Platform Checks and Supports, of which the following is a specification.

My invention relates to scales in which the platform of the scale is provided with means for checking it against movements in response to horizontal stresses caused by the application of the load to the scale, and with supports through which said platform rests upon the levers without constraining them horizontally when the platform or foundations change length due to temperature changes or other causes.

My invention is illustrated in the accompanying drawings, in which—

Fig. 4 is a section, on a larger scale, showing one of the supporting rollers, etc., shown in Figs. 1 and 2.

My invention will be more fully understood from the following detailed description of the drawings, in which the same numerals in the various figures, refer to the same parts.

Figure 1:
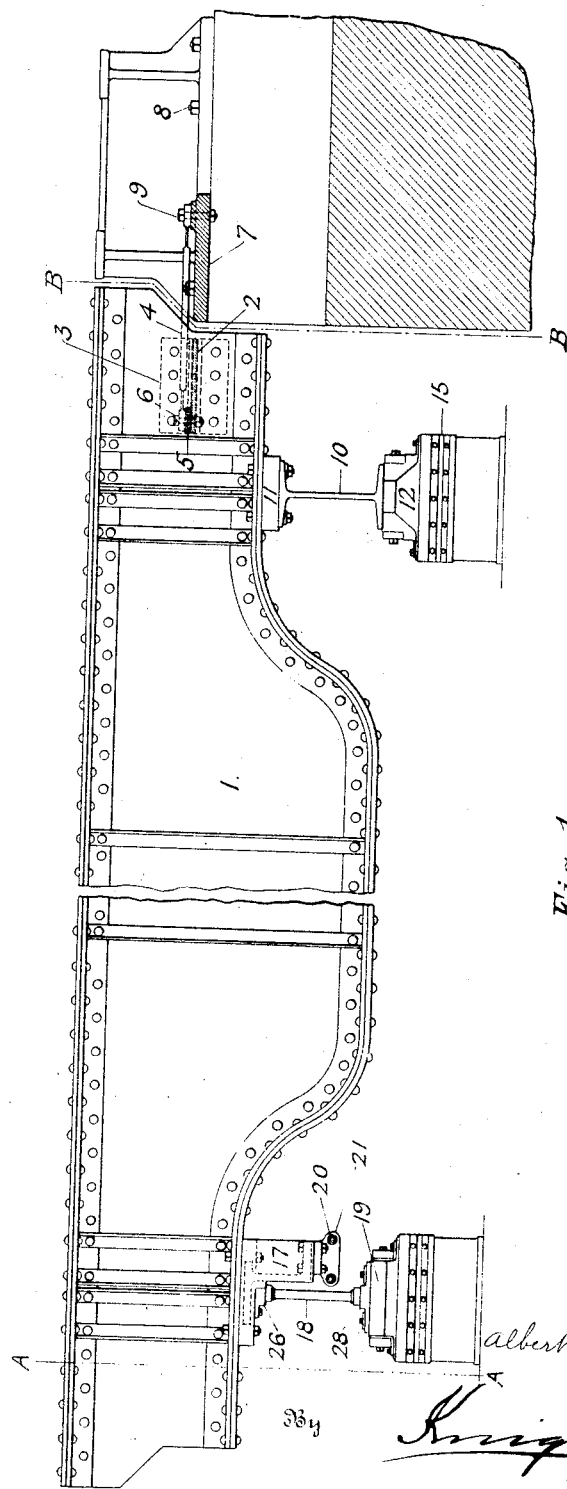
Figure 1 is a side elevation of a scale platform and supporting levers, the end foundation casting being in section.

1 is the scale platform, here shown of a built-up bridge or girder construction properly braced and stiffened. 2 is a cross plate fastened to the girders by angles 3, thus forming an integral part of the scale platform. 4 is a stay plate, raised above plate 2 by a blocking plate 5 and securely fastened to said plate 2 of the platform, by bolts 6, preferably reamed in place. 7 is a foundation bed firmly set in the masonry and held by bolts 8. The stay plate 4 is securely fastened to the bed 7 by bolts 9.

10 is a transverse beam supporting one end of the platform through the blocks 11. This beam 10 rests on the loading platforms 12, which have fastened to them the loading fulcrums 13. These fulcrums are also secured to the scale levers 14.

Figure 2:
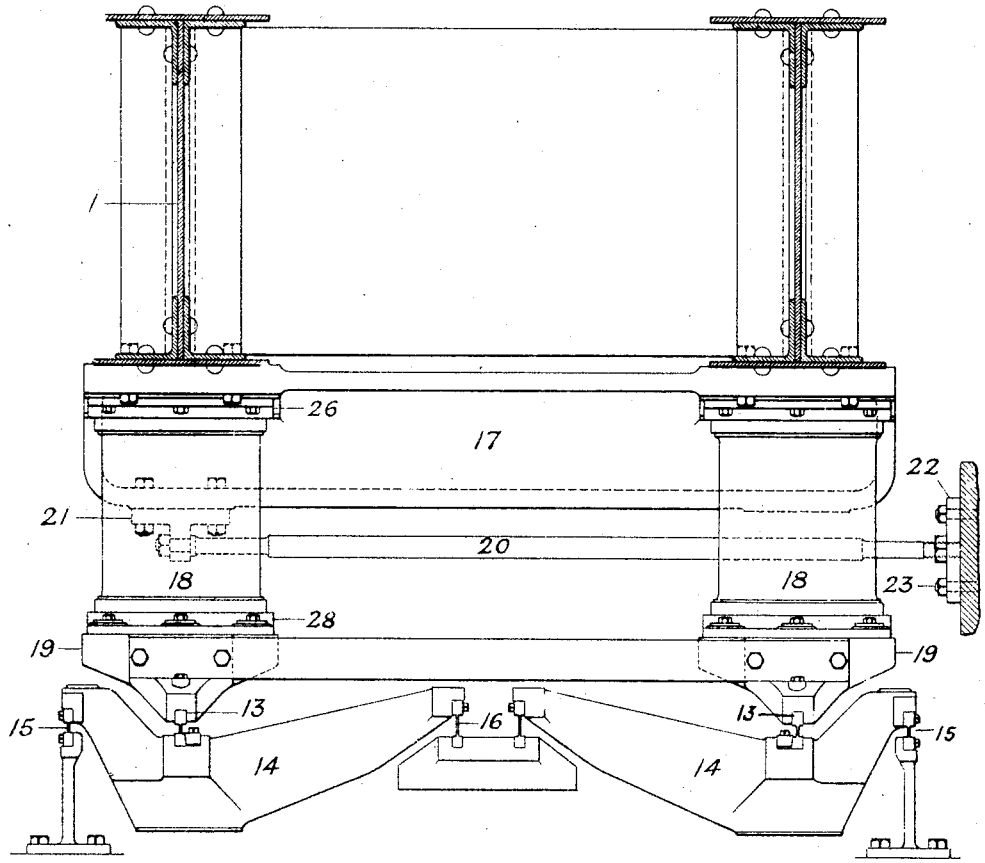
Fig. 2 is a cross section on the line A—A, Fig. 1, showing the platform, levers, supporting rollers and transverse stays.
Figure 3:
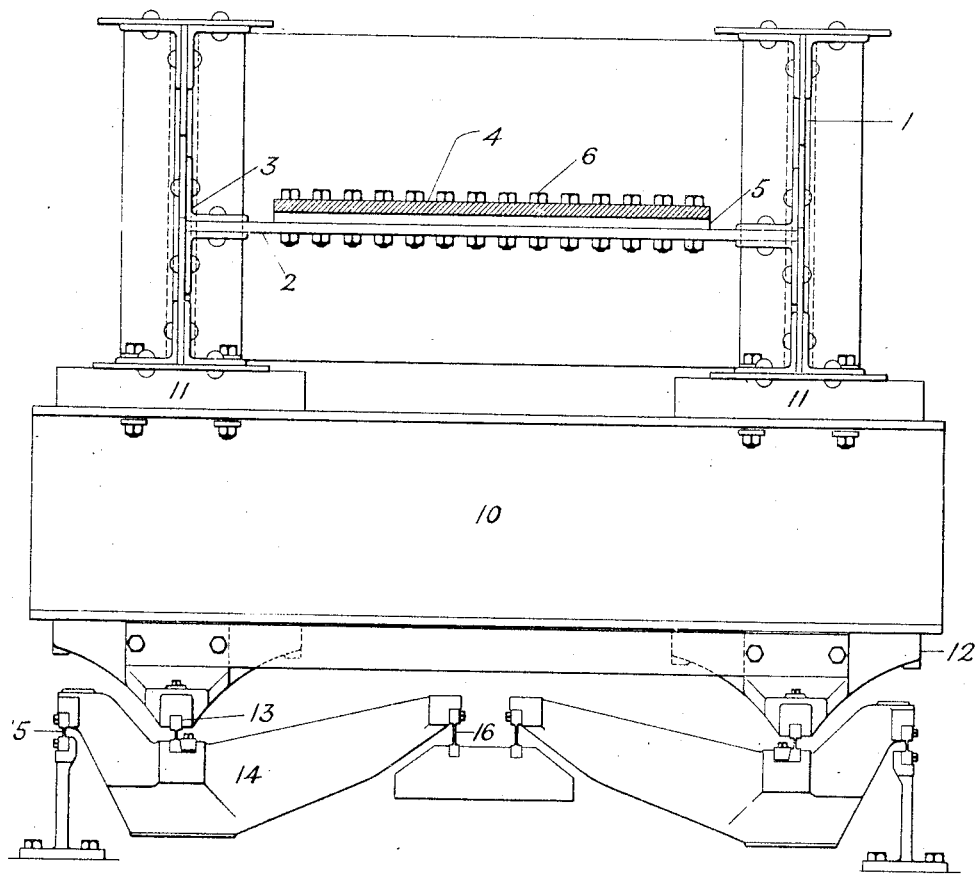
Fig. 3 is a cross section on the line B—B, Fig. 1, showing the scale platform, levers and supporting beam with the longitudinal stay in section; in each of Figs. 2 and 3, the view is toward the center of the scale.

The levers 14 also have fixed fulcrums 15 and transmitting fulcrums 16. Similar levers 14, with loading fulcrums 13, fixed fulcrums 15 and transmitting fulcrums 16, with lever-loading platforms 19 are also provided near the other end of the scale (Fig. 2), at which end, the two sides of the platform or bridge 1 rest on and are connected by a casting 17 and rolling supports 18 (see also Fig. 4), placed between said member 17 and lever-loading platforms 19.

Stay bars 20 are secured to the member 17 by bracket 21, and to the foundations by plate 22 and bolts 23. As shown in Fig. 4, the rolling supports 18 are provided with hardened ends 24, the bearing faces of which are finished to cylindrical form, so that each support 18 with its ends 24 forms a portion of a cylinder, the axis of which coincides with the middle point of the support. A complete cylinder could be used, but for economy I prefer the construction shown. The parts 24 roll on hardened plates 25 and the upper plates are secured in place by angle pieces 26. Packings 27 keep water and dirt out of the spaces between parts 24 and 25.

Parts 28 with packings 27 have a similar function at the lower ends of supports 18 and are adjustably secured to the top of lever-loading platforms 19.

In the ordinary knife edge scale, it is desirable to keep the knife edges from slipping on their bearing plates, especially when under load, and in scales with plate fulcrums, it is important to so construct the platform and its connections to the levers that the plate fulcrums are not subjected to horizontal stresses. These stresses might be introduced through relative changes of position of parts caused by temperature changes or by the application of loads especially in the case of a track scale where a locomotive may run over the platform while pulling or pushing a train, or where a car may run over the platform with the brakes applied. It is also necessary that very little or no vertical load be received by the platform from the checks or stays. It is the regular practice to make the checks in such a manner as to allow the platform to move freely for a small distance in a horizontal direction, but a system such as here described and claimed is better, as it eliminates the sliding between knife edges and their bearings when employed, and does not allow any horizontal loads to be transmitted to plate fulcrums when they are used.

To reduce the vertical load necessary to bend the stays the slight amount caused by the springing of parts under load, the stays are reduced in section for a short distance near each end, thus greatly increasing their flexibility for loads acting transversely of their length but decreasing their rigidity for longitudinal loads only slightly.

In the construction illustrated, the longitudinal stay 4 is attached to the platform near one end and this end is carried by I-beam 10 which will flex easily enough to allow for the change of length of the stay plate due to temperature or other cause, but this stay plate could be attached elsewhere, if desired, and rollers such for instance as provided by parts 18, 24, could be used at this end of the platform as well.

The longitudinal stay 4 is shown as a wide plate which gives it transverse stiffness and causes it to act as a transverse stay also, but it could be made of one or more narrow stays and a separate transverse stay used at this end also.

Temperature changes will cause a change of length of the platform and change of load may also cause slight changes, but the rollers will allow these to take place without injury to fulcrums or change of balance of the scale.

I claim:—

1. In a track scale, a bridge constituting the main platform of the scale, a large wide horizontal flexible stay-plate, one end of which is rigidly secured to one end of the bridge and the other end is rigidly secured to the foundations, in combination with a long horizontal stay rod placed at right angles to the bridge near its other end, one end of said rod being rigidly secured to the bridge while the other end of said rod is rigidly secured to the foundations.

2. In a track scale, a bridge constituting the main platform of the scale, a large wide horizontal stay plate, one end of which is rigidly secured to one end of the bridge and the other end is rigidly secured to the foundations, said stay plate being thinned for a short distance near each end to increase its flexibility vertically, in combination with a long horizontal stay rod placed at right angles to the bridge near its other end, one end of said rod being rigidly secured to the bridge while the other end of said rod is rigidly secured to the foundations.

3. In a scale, a bridge constituting the main platform of the scale, a horizontal stay securely fixed to the scale foundations and to one end of said bridge securely fixing it against horizontal motion, a suitable support under said end of the bridge, and rolling supports under the other end of said bridge.

4. In a scale, a bridge constituting the main platform of the scale, a horizontal stay securely fixed to the scale foundations and to one end of said bridge to secure it against horizontal motion, a suitable support under said end of the bridge, rolling supports under the other end of said bridge, a pair of first levers, loading platforms for said first levers, upon which said supports rest, and plate fulcrums connecting said loading platforms and levers.

5. In combination with a track scale platform, a horizontal stay plate firmly secured to one end of said platform and adapted to prevent horizontal motion of that end of the platform in any direction, a suitable support for said end of the platform, a set of supporting rollers under the other end of the platform, and a transverse horizontal stay secured to said other end of the platform and to the scale foundations, and adapted to permit longitudinal motion of this said other end of the platform but fixing it against lateral motion.

6. In a scale, two pairs of first levers, a loading platform and loading fulcrum for each lever, a main platform, rolling supports between one pair of said lever-loading platforms and one end of said main platform, an I-beam between the other end of said main platform and the other pair of said lever-loading platforms, and a large wide stay plate secured to the foundation and to said main platform near the end supported by said I-beam, adapted to fix the main platform against horizontal motion at said end, and a transverse stay secured to the foundation and to the end of the main platform remote from said stay plate, adapted to fix said platform at said remote end, against lateral horizontal motion.

7. In a scale, two pairs of first levers, a loading platform and connecting plate fulcrum for each lever, a scale platform, an I-beam between one end of the scale platform and the lever-loading platforms near said end, a horizontal stay plate secured to the foundation and to the scale platform at its said end, and rolling supports between the other end of said scale platform and the lever-loading platforms near said other end.

The foregoing specification signed at Glenbrook, Connecticut, this sixth day of January, 1916.

ALBERT HAMILTON EMERY.